INVENTORS
YOSHINORI KAWAI
HISAKATSU KIWAKI
HIROSHI SATO
By [signature]
ATTORNEY

INVENTORS
YOSHINORI KAWAI
HISAKATSU KIWAKI
HIROSHI SATO
BY [signature]
ATTORNEY

INVENTORS
YOSHINORI KAWAI
HISAKATSU KIWAKI
HIROSHI SATO

By [signature]
ATTORNEY

INVENTORS
YOSHINORI KAWAI
HISAKATSU KIWAKI
HIROSHI SATO
By P. M. Craig, Jr
ATTORNEY

INVENTORS
YOSHINORI KAWAI
HISAKATSU KIWAKI
HIROSHI SATO

By P.M. Craig Jr.
ATTORNEY 3,374,440
Patented Mar. 19, 1968

3,374,440

MAGNETIC AMPLIFIER CONTROLLED POWER CIRCUIT OPERATIVE WITH D.C. ELECTRIC SOURCE

Yoshinori Kawai, Katsuta-shi, Hisakatsu Kiwaki, Mito-shi, and Hiroshi Sato, Katsuta-shi, Japan, assignors to Hitachi, Ltd., Tokyo, Japan, a corporation of Japan Filed Nov. 25, 1963, Ser. No. 325,827
Claims priority, application Japan, Nov. 24, 1962, 37/52,932
10 Claims. (Cl. 330—8)

ABSTRACT OF THE DISCLOSURE

A magnetic amplifier controlled power circuit operable from a D.C. source for feeding a load with proportionally controlled current. The power circuit is comprised by a pair of saturable magnetic cores having a control winding wound on and extending over the pair of cores and a pair of output windings each respectively wound on one of the pair of cores. A pair of semiconductor switching elements are provided each having two load electrodes and a control electrode, respectively. The load electrodes of each of the semiconductor switching elements are connected in series with respective output windings, and a direct current electrical source and a load are connected in common with each of the series connected semiconductor switching elements and its series connected output winding. Turn on circuits are connected to the control electrodes of each of the switching semiconductor devices and to respective ones of the saturable cores for turning on the semiconductor switching elements in response to the saturation condition of the cores. As a consequence of this arrangement, the semiconductor switching elements are rendered conductive and non-conductive alternately in accordance with the saturation and non-saturation of the pair of magnetizable cores. The circuit is completed by means for applying a variable magnitude direct current control signal to the control winding to control the frequency of turn-on and turn-off of the circuit to thereby proportionally control the pulsating power output from the amplifier.

This invention relates to magnetic amplifiers comprising a pair of saturable iron cores, and a pair of semiconductor switching elements, and operative with D.C. electrical sources.

Most of the known magnetic amplifiers comprise control windings, output windings, feedback windings, etc., respectively wound on saturable iron cores, with A.C. electric sources applied to the output windings through rectifiers and loads, output currents being under control of control currents.

It is an object of the present invention to provide magnetic amplifiers operative with D.C. electric sources.

Another object of the invention is to utilize control rectifiers for providing large-capacity D.C.-operative magnetic amplifiers.

Another object of the invention is to provide large-capacity switching elements having jumping characteristics by application of positive feedback.

A further object of the invention is to provide magnetic amplifiers relatively insensible to mechanical vibrations, with high fidelity, thus making themselves suitable for mounting on cars and aircrafts.

A further object of the invention is to provide an A.C.-energized magnetic amplifier with D.C.-auxiliary energy source which may be operatively used when the A.C. source would have failed.

The present invention will best be understood from the following detailed descriptions of preferred embodiments of the invention with reference to the accompanying drawings; in which FIG. 1 is a circuit diagram showing an embodiment of the invention;

Figure 1:
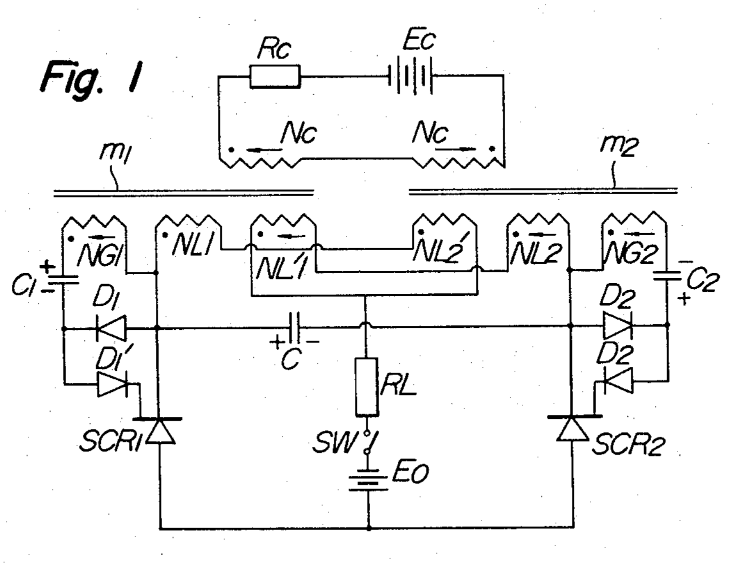

Referring now to FIG. 1 of the drawings, the magnetic amplifier shown comprises a pair of control rectifiers SCR1 and SCR2, which may be known thyratrons or silicon controlled rectifiers, diodes D1, D1′ and D2, D2′, saturable iron cores *m1* and *m2*, and control windings NC, output windings NL1, NL′1 and NL2, NL′2, and gate windings NG1 and NG2, respectively wound on the cores *m1* and *m2*.

A D.C. electrical source E*o* is applied to output windings NL1, NL′2 and NL2, NL′1, through a load RL and a pair of silicon controlled rectifiers SCR1, SCR2, respectively, gate windings NG1 and NG2 being connected from the cathodes of respective silicon controlled rectifiers SCR1 and SCR2, through condenser C1, diode D1′ and condenser C2, diode D2′ to the control gates of SCR1 and SCR2, respectively. Condenser charging diodes D1 and D2 are connected between one end of each of the gate windings NG1 and NG2 and the outer end of each of the capacitors C1 and C2, respectively. The magnetic amplifier shown further comprises condensor-charging diodes D1 and D2, a commutating condensor C, and a D.C. control or input voltage source E*c*.

The operation of the device shown in FIG. 1 will now be described. It is here assumed that SCR1 is conductive, while SCR2 is non-conductive. E*o* is applied to windings NL1 and NL′2 through SCR1, and at the same time to the circuit SCR1–C–NL2–NL′1. Condenser C is selected to be fully charged within fairly a short period of time, so that the circuit $E_O$–SCR1–C–NL2–NL′1–RL–SW–EO may be considered open substantially during the conducting period of silicon controlled rectifier SCR1.

By application of $E_0$ voltage across windings NL′1 and NL2 in series, voltages are induced in respective windings NG1 and NG2 in the directions shown by arrows in FIG. 1. Consequently, condenser C1 is charged by the now-closed circuit C1–D1′–SCR1 (gate and cathode), while condenser C2 is charged through diode D2, in the polarities shown respectively in FIG. 1. By this, the gate current of SCR1 flows easily, while the gate current of SCR2 cannot flow by reason of the reverse bias of forward voltage-drop component of diode D2. This reverse bias serves to prevent SCR2 from its false operation with more or less noise.

The fluxes of cores *m1* and *m2* change gradually from saturation in one direction to saturation in the other, respectively. Thus, when core *m2* has become saturated, the E.M.F. induced in gate winding NG2 becomes substantially zero instantaneously, resulting in discharge of condenser C2 through D2′ and gate-cathode of SCR2, which renders SCR2 conductive.

Consequently, the charge on condenser C is instantaneously discharged through SCR1 and SCR2, the forward-direction current decreasing below its holding-current value, so that SCR1 is rendered non-conductive. The commutating operation of SCR1 and SCR2 is thus repeated indefinitely along with changes in states of cores *m1* and *m2* from one-direction saturation to the other.

It is to be understood that transistors may be used in place of above-referred silicon controlled rectifiers as the semiconductor switching elements.

Now, we will provide a simple analysis of the above-described circuitry. In FIG. 1, when SCR1 is conductive, the following equations are established, where $$NL1=NL2=NL'1=NL'2=NL$$

(number of turns), the charging currents of C1, C2, etc. are negligible, and the load current, control current and control voltage are assumed $iL$, $iC$, and $Ec$, respectively:

$$Eo=NL\phi_1+NL\phi_2+RL(i_1+i_2) \qquad (1)$$

$$Eo=Q/C-NL\phi_2-NL\phi_1+RL(i_1+i_2) \qquad (2)$$

$$Q=\int i_2 dt \qquad (3)$$

$$Ec=R_c i_c+Nc\phi_2-Nc\phi_1 \qquad (4)$$

where $Q$=charge on condenser C.
$\phi_1$=flux in core $m1$.
$\phi_2$=flux in core $m2$.

Neglecting the magnetizing currents of cores $m1$ and $m2$, these cores being not saturated, $$NL(i_1-i_2)=N_c i_c \qquad (5)$$

$$NL(i_2-i_1)=-N_c i_c \qquad (6)$$

where $i_1$=current flowing through NL1 and NL'2.
$i_2$=current flowing through NL2 and NL'1.
$i_c$=current flowing through the control circuit $R_c$–$E_c$–$N_c$.

From the above equations are obtained the following ones:

$$\left.\begin{aligned}\phi_1&=\frac{1}{2}\left(\frac{Q}{2NLC}-\frac{E_c}{N_c}\right)\\ \phi_2&=\frac{1}{2}\left(\frac{Q}{2NLC}+\frac{E_c}{N_c}\right)\end{aligned}\right\} \qquad (7)$$

As a result, if $E_c=0$, $\phi_1$ and $\phi_2$ reach saturation simultaneously, but if $E_c>0$, $\phi_2$ reaches saturation before $\phi_1$. From Equations 1 and 2, $$2E=Q/C+4RL\frac{dQ}{dt}$$

$$\therefore Q=2CE\left(1-\Sigma-\frac{t}{4RLC}\right) \qquad (8)$$

$$i=\frac{E}{2RL}\,\Sigma-\frac{t}{4RLC} \qquad (9)$$

$$(\dot{\phi}_1+\dot{\phi}_2)=\frac{Q}{2NLC}=\frac{E}{NL}\left(1-\Sigma-\frac{t}{4RLC}\right) \qquad (10)$$

Thus, the change in $\phi_1+\phi_2$ is similar to that in Q.

Consequently, the voltage $V_{ac}$ across windings NL1 and NL'2 in series is $$V_{ac}=NL(\dot{\phi}_1+\dot{\phi}_2) \qquad (11)$$

Figure 2:
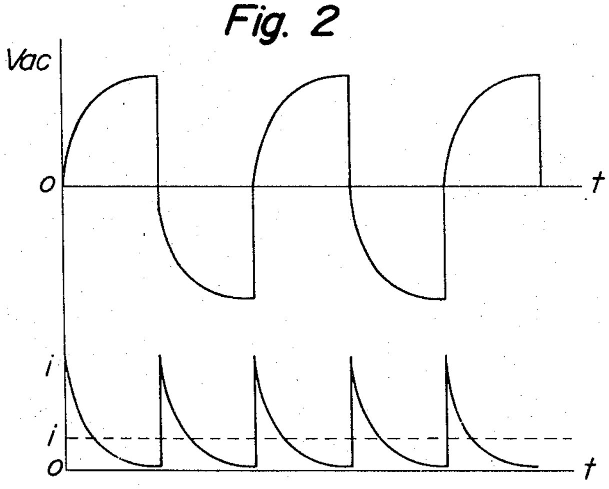
FIGS. 2, 3 and 4 are curve diagrams to be utilized for explanation of operation of the magnetic amplifier shown in FIG. 1.

FIG. 2 shows waveforms of $V_{ac}$ and $i$, the horizontal dot line showing the average value of $i$, wherein $i$ is the current flowing through RL.

Figure 3:
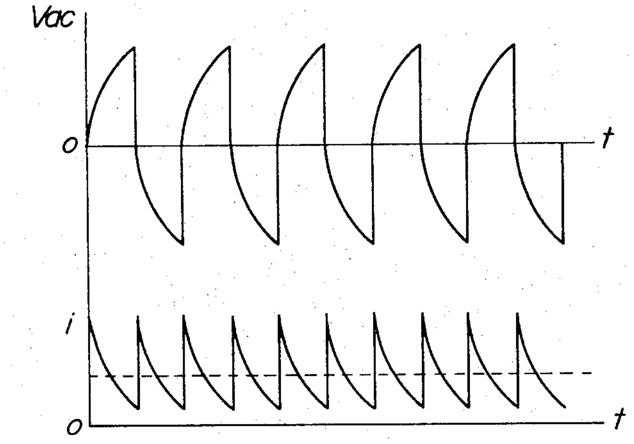

If $E_c$ becomes larger and larger, the period of time required for $\phi_2$ to reach saturation becomes shorter and shorter, and the values become as shown in FIG. 3.

Figure 4:
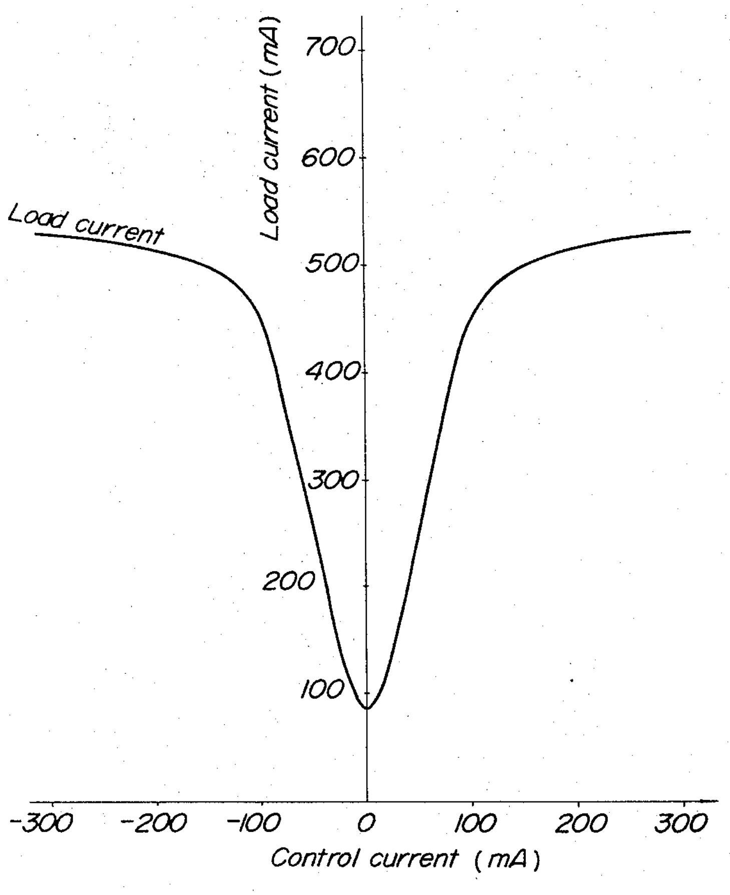

The characteristic curve of load current and control current at such a time is shown in FIG. 4. The present invention utilizes such a straight-line characteristic for providing magnetic amplifiers operative with D.C. electrical source, that is, the control curent $m$A (see FIGURE 4) is in the range of about zero to one hundred or minus one hundred.

Figure 5:
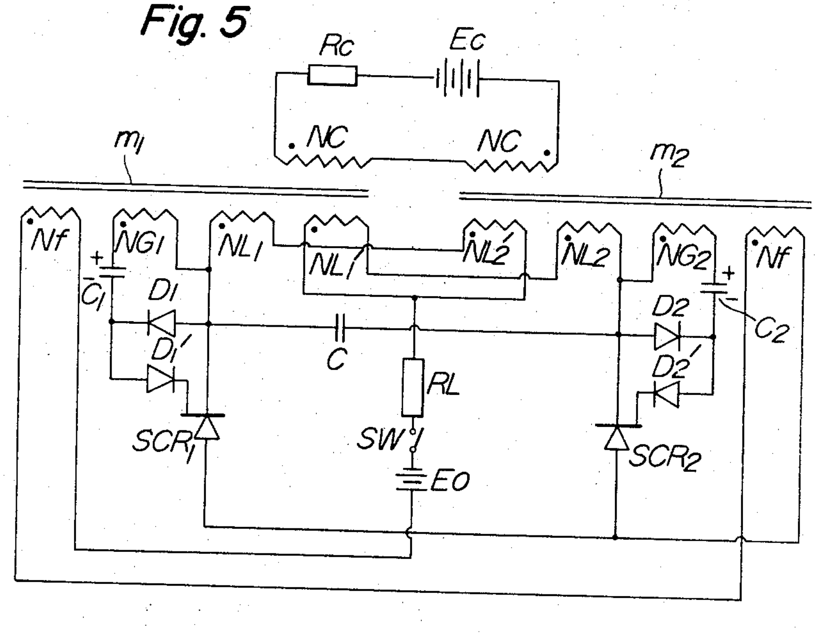
FIG. 5 is a circuit diagram showing another embodiment of the invention.
Figure 6:
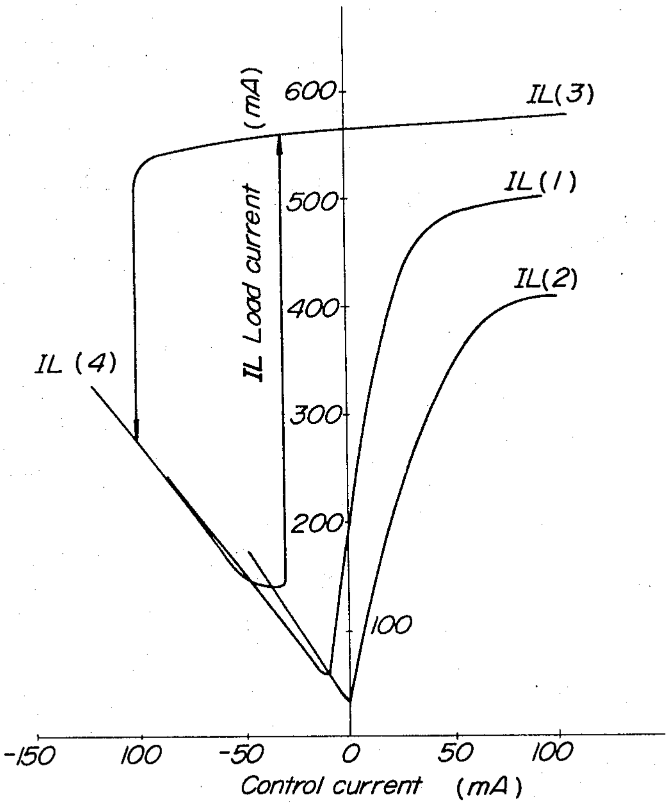
FIG. 6 is a curve diagram to be utilized for explanation of operation of the device shown in FIG. 5.

According to the invention, each iron core may also be provided with a feedback winding $N_f$ as shown in FIG. 5. By this, the load current is fed back positively, so that there may be obtained jumping characteristics (1), (2) or hysteresis characteristics (3), as shown in FIG. 6.

Figure 7:
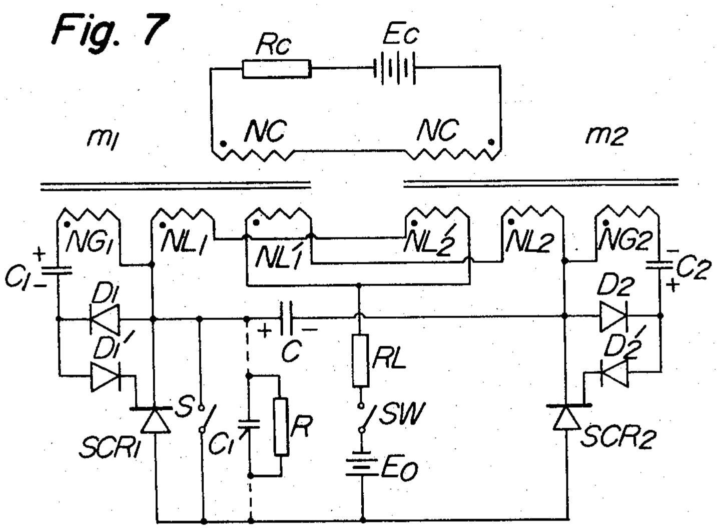
FIGS. 7 and 8 are circuit diagrams, respectively showing further embodiments of the invention.

In order to start the device of present invention, a switch S may be provided, as shown in FIG. 7, for short-circuiting SCR1, or condenser C'1, resister R, etc., may be connected in parallel with SCR1. Although not illustrated, for starting, the D.C. source $E_o$ may be differentiated through a condenser and applied to the gate of SCR1.

Figure 8:
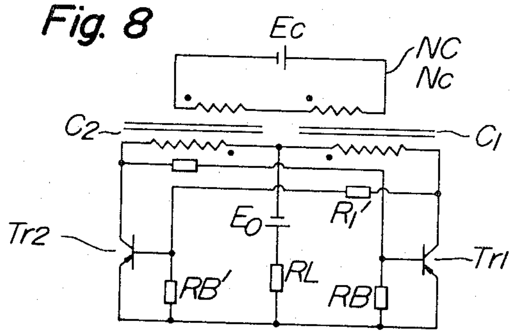

FIG. 8 shows another embodiment of the invention, simplified by use of transistors and having jumping characteristics.

What we claim is:

1. A magnetic amplifier controlled power circuit for feeding a load, comprising a pair of saturable magnetic cores, a control winding wound on and extending over both of said pair of cores, a pair of output windings each respectively wound on at least one of said pair of cores, a pair of semiconductor switching elements each having two load electrodes and a control electrode, respectively, with the load electrodes of each of said semiconductor switching elements being connected in series circuit relationship with at least one of said output windings, a direct current electrical source and a load connected in series circuit relationship in common with each of the series connected semiconductor switching elements and its series connected output winding, turn on circuit means coupled between the control electrodes of said switching semiconductor devices and at least one load terminal of the semiconductor switching elements and responsive to the saturation condition of the saturable magnetic cores for turning on the semiconductor switching elements in response to the saturation condition of the cores whereby the semiconductor switching elements are rendered conductive and non-conductive alternately in accordance with saturation and non-saturation of said pair of magnetizable cores, and means for applying a variable magnitude direct current control signal to the control winding for variably controlling the rate of saturation of the saturable magnetic core.

2. A magnetic amplifier controlled power circuit according to claim 1, in which said semiconductor switch elements are transistors.

3. A magnetic amplifier controlled power circuit according to claim 2 in which the turn-on means operatively coupled to the control electrodes of the switching semiconductor devices and respective ones of the saturable cores is comprised by a limiting impedance connected between the base electrode of each of the transistors and the juncture of the load terminal of the opposite transistor with its series connected output winding.

4. A magnetic amplifier controlled power circuit according to claim 1 wherein the turn-on means comprises respective gate windings wound on each of said saturable cores and circuit means operatively coupling said gate windings to the control electrodes of respective ones of the switching semiconductor elements.

5. A magnetic amplifier controlled power circuit according to claim 1, in which each of the saturable magnetic cores is further wound with a gate winding and both ends of each of the gate windings are connected with a diode through a capacitor respectively between an output electrode and the control electrode of one of the semiconductor switching elements, and further condenser charging diodes are connected between one end of each of the gate windings and outer end of each of the capacitors, respectively.

6. A magnetic amplifier controlled power circuit according to claim 1 wherein said semiconductor switch elements are formed by silicon controlled rectifiers.

7. A magnetic amplifier controlled power circuit according to claim 6 wherein a commutating capacitor is connected between corresponding load terminals of said silicon controlled rectifiers.

8. A magnetic amplifier controlled power circuit according to claim 7 in which said pair of output windings comprise first and second winding portions each portion being wound on and extending over a respective one of said pair of saturable magnetic cores.

9. A magnetic amplifier controlled power circuit according to claim 8 in which each of the saturable magnetic cores is further wound with a gate winding and both ends of each of the gate windings are connected with a diode through a capacitor respectively between an output electrode and the control electrode of one of the semiconductor switching elements, and further condenser charging diodes are connected between one end of each of the gate windings and the outer end of each of the capacitors respectively.

10. A magnetic amplifier controlled power circuit according to claim 9 in which each of the saturable magnetic cores is further wound with a feedback winding which is connected in series with the load and the D.C. power source so that current flowing in the load also flows through said feedback windings.

References Cited

UNITED STATES PATENTS

| | | | |
|---|---|---|---|
| 3,034,015 | 5/1962 | Schultz | 331—113.1 X |
| 3,078,380 | 2/1963 | Ingman | 307—88.5 |
| 3,189,748 | 6/1965 | McMurray | 330—8 X |
| 3,209,227 | 9/1965 | Berman et al. | 307—88.5 |
| 3,237,126 | 2/1966 | Baycura et al. | 331—113 |
| 3,251,006 | 5/1966 | Mehwald | 331—113 |

ROY LAKE, *Primary Examiner.*

NATHAN KAUFMAN, *Examiner.*